US008331436B2

(12) United States Patent
Jayant et al.

(10) Patent No.: US 8,331,436 B2
(45) Date of Patent: Dec. 11, 2012

(54) EXPERT SYSTEM AND METHOD FOR ELASTIC ENCODING OF VIDEO ACCORDING TO REGIONS OF INTEREST

(75) Inventors: Nuggehally Sampath Jayant, Alpharetta, GA (US); Sira P. Rao, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 1073 days.

(21) Appl. No.: 12/226,957

(22) PCT Filed: May 1, 2007

(86) PCT No.: PCT/US2007/010579
§ 371 (c)(1),
(2), (4) Date: Nov. 3, 2008

(87) PCT Pub. No.: WO2007/130425
PCT Pub. Date: Nov. 15, 2007

(65) Prior Publication Data
US 2009/0232203 A1    Sep. 17, 2009

Related U.S. Application Data (60) Provisional application No. 60/796,480, filed on May 1, 2006.

(51) Int. Cl.
*H04N 7/12* (2006.01)
(52) U.S. Cl. ......... 375/240.02; 375/240.01; 375/240.03; 375/240.05; 375/240.26; 375/240.28; 348/180; 348/239; 348/465; 348/578; 710/57; 710/107; 709/219

(58) Field of Classification Search ........ 375/240.01–240.03, 240.05, 240.26, 375/240.28; 348/180, 239, 465, 578; 709/219; 710/57, 107
See application file for complete search history.

(56) References Cited

U.S. PATENT DOCUMENTS

| | | | |
|---|---|---|---|
| 5,717,464 A * | 2/1998 | Perkins et al. | 375/240.05 |
| 5,734,843 A * | 3/1998 | Gephardt et al. | 710/107 |
| 5,799,111 A | 8/1998 | Guissin | |
| 6,178,204 B1 | 1/2001 | Hazra | |
| 6,195,394 B1 | 2/2001 | Arbeiter et al. | |
| 6,256,423 B1 | 7/2001 | Krishnamurthy et al. | |
| 6,437,821 B1 | 8/2002 | Janko et al. | |
| 2003/0051843 A1 | 3/2003 | Keller et al. | |
| 2003/0138163 A1 | 7/2003 | Chen et al. | |
| 2004/0013315 A1 | 1/2004 | Li et al. | |
| 2004/0054758 A1* | 3/2004 | Chang et al. | 709/219 |
| 2004/0156559 A1 | 8/2004 | Cheng et al. | |
| 2006/0072673 A1 | 4/2006 | Holcomb et al. | |
| 2006/0268980 A1 | 11/2006 | Le Dinh et al. | |
| 2007/0053575 A1 | 3/2007 | Prakash et al. | |

OTHER PUBLICATIONS

International Search Report, PCT/US2007/010579, Jul. 3, 2008, United States Patent and Trademark Office.

* cited by examiner

*Primary Examiner* — Thanhnga B Truong
(74) *Attorney, Agent, or Firm* — King & Spalding (57) ABSTRACT

An elastic expert system for allocating bits according to application domain requirements and network resources. The elastic expert system observes the network resources and determines a state for allocating bits, the state relating to the application domain requirements. The elastic expert system can then allocate bits to a region-of-interest based on the determined state. The elastic expert system also can allocate bits to a background region and an extended region of interest.

20 Claims, 8 Drawing Sheets

EXPERT SYSTEM AND METHOD FOR ELASTIC ENCODING OF VIDEO ACCORDING TO REGIONS OF INTEREST

RELATED PRIORITY APPLICATION

This application is a National Stage patent application filed under 35 §317 of International Patent Application No. PCT/US2007/010579, filed May 1, 2007, which designated the United States of America, and which claims priority to U.S. Provisional Patent Application No. 60/769,480, filed May 1, 2006. The disclosure of each of the above-identified related applications is hereby fully incorporated herein by reference.

FIELD OF THE INVENTION

The present invention relates to encoding video at subjectively acceptable quality over limited and variable bit-rate networks using a region-of-interest framework. More generally described, the present invention provides an elastic expert system and method for assigning bit-rates to regions of encoded video based on domain and application specific awareness.

BACKGROUND OF THE INVENTION

Remote assessment of distressed patients using telemedicine systems is likely to be a critical and pervasive component of future healthcare systems. Depending upon geography and economics, remote assessment is likely to occur over both wired and wireless networks and, thus, over a broad spectrum of transmission bandwidths ranging from very low to very high. Available transmission bandwidth can place a significant constraint on the overall compression ratio of the video, but for diagnostic purposes—i.e., for clinical or functional acceptability—it is essential that the compression process causes no tangible loss of detail and introduces no noticeable artifacts which could lead to misinterpretation. Accordingly, tele-medicine or tele-health systems that have the potential to deal with such bandwidth limitations while providing visually acceptable video will provide specialists with significantly more information for assessment, diagnosis, and management than will systems without that capability.

Region-of-interest (ROI) based video processing is useful for achieving optimal balance in the quality-bandwidth trade-off. Conventional ROI coding typically divides compressed video into two regions—the ROI and background (BKGRND) and assigns varying compression to each region. Thus, ROI video coding provides higher quality in the ROI, but poorer quality in the BKGRND, for a given total bit-rate (TBR). Further, in some systems, the BKGRND is dropped altogether. An extension of the ROI concept is the extended region-of-interest (EROI), which consists of an intermediate region between the ROI and BKGRND. The EROI enhances the elasticity of an ROI based video coding scheme by allowing for a more perceptually pleasing degradation in quality from the ROI.

When the total bit-rate (TBR) permits, the ROI can be coded with no loss in quality compared to the original. This is called mathematical losslessness (ML). A step down from ML is perceptual losslessness (PL). PL video coding incorporates human visual system (HVS) factors into a distortion measure to determine the optimum value of a parameter that satisfies a given threshold. When this threshold equals the just-noticeable-difference (JND), the result is PL encoded video (when compared with the original). Because of the many solutions for PL video coding, most commercial video coders incorporate different levels of empirical perceptual tuning.

However, in a medical application, the definition of PL must be different from the HVS based definition of PL. The latter is based on masking properties of the HVS, which may not be consistent with the details a medical expert wants to see in a video. That is, a HVS definition of PL applied to a video will add distortion to regions that the HVS considers as unimportant, but these might be critical diagnostic regions for the medical expert. Hence, the definition of PL referred to herein is considered to be a level of video that is visually perfect i.e., free of any artifacts.

Beyond the PL criterion for video coding is D-losslessness or F-losslessness. In medical or other visual applications, if an expert feels confident making an assessment with the coded video, the coding is said to be diagnostically lossless (DL) or functionally lossless (FL). Therefore, a determination of whether video is DL or FL also involves HVS factors, but in a domain context. Beyond DL or FL quality, a quality level that may contain artifacts but is not distracting or annoying is termed Best Effort (BE). The ML, PL, DL (in general, FL), and BE hierarchy explained above is general. However, depending on the application, PL may fall anywhere in the hierarchy. In other words, with PL video coding, the system may be under-designed or over-designed with respect to DL or FL.

In general, conventional ROI systems employ arbitrary choices for ROI and BKGRND compression ratios and thus are not human-centric. Hence, there is no guarantee of video quality, even within the ROI, and there is no opportunity for user interaction or input. Accordingly, based on the above, there presently exists a need in the art for a rate control method where, unlike conventional methods, bit allocation is shifted from the frame level to individual regions within the frame, with application domain requirements and network requirement being utilized to determine regional bit allocation.

SUMMARY OF INVENTION

The elastic expert system can be used to allocate bits efficiently according to application domain requirements and network resources. The network can be any type of transmission medium, including, but not limited to, a wired network, wireless network, and mobile network. Regardless of the type of network, the elastic expert system is capable of observing the bits available for the network (i.e., bandwidth) and, based on this evaluation, can allocate a portion of the total bits available to a region-of-interest by examining the application domain requirements.

The application domain requirements may comprise bit-rate values representing perceptual losslessness (PL), functional (or diagnostic) losslessness (FL or PL), and best effort (BE). These values can be gathered using a functional hierarchy assessment. The functional hierarchy assessment may comprise playing videos to an identified group of subjects to evaluate functional or diagnostic quality of video. The results of the functional hierarchy assessment can then be used to determine values for PL, FL, and BE.

Based on the application domain requirements, the elastic expert system may formulate states to efficiently allocate bit-rates between a region-of-interest and background in an encoded video. To enter a state, the total bits available for an encoded video are compared to the bits required for the background and region-of-interest for that state. If the state can be entered, then the elastic expert system will set the bits for the background and the region-of-interest according to that state. If the state cannot be entered, the elastic expert system will evaluate the next state. For one aspect of the elastic expert system, the states are numbered sequentially (e.g., 1 to 10) according to decreasing priority. This is based on the premise that the ROI quality should be at least the same as or better than the BKGRND quality.

BRIEF DESCRIPTION OF THE DRAWINGS

The advantages and aspects of the present invention will be more fully understood in conjunction with the detailed description which follows, and the accompanying figures, wherein.

DETAILED DESCRIPTION

The inventive elastic expert system can be used to deliver diagnostically acceptable video quality over limited and variable bit-rate networks using a region-of-interest framework. The design of the system consists of quantification of video quality through tests on training videos with a representative audience, typically subject-matter experts, such as medical experts for tele-medicine videos, incorporation of the above information into the video encoder through the use of encoder states, and fine tuning of these states based on built-in quality criteria. The elastic expert system may be used in any situation where it is desirable to encode a region-of-interest for functional assessment including, but not limited to tele-health and surveillance applications.

Figure 1:
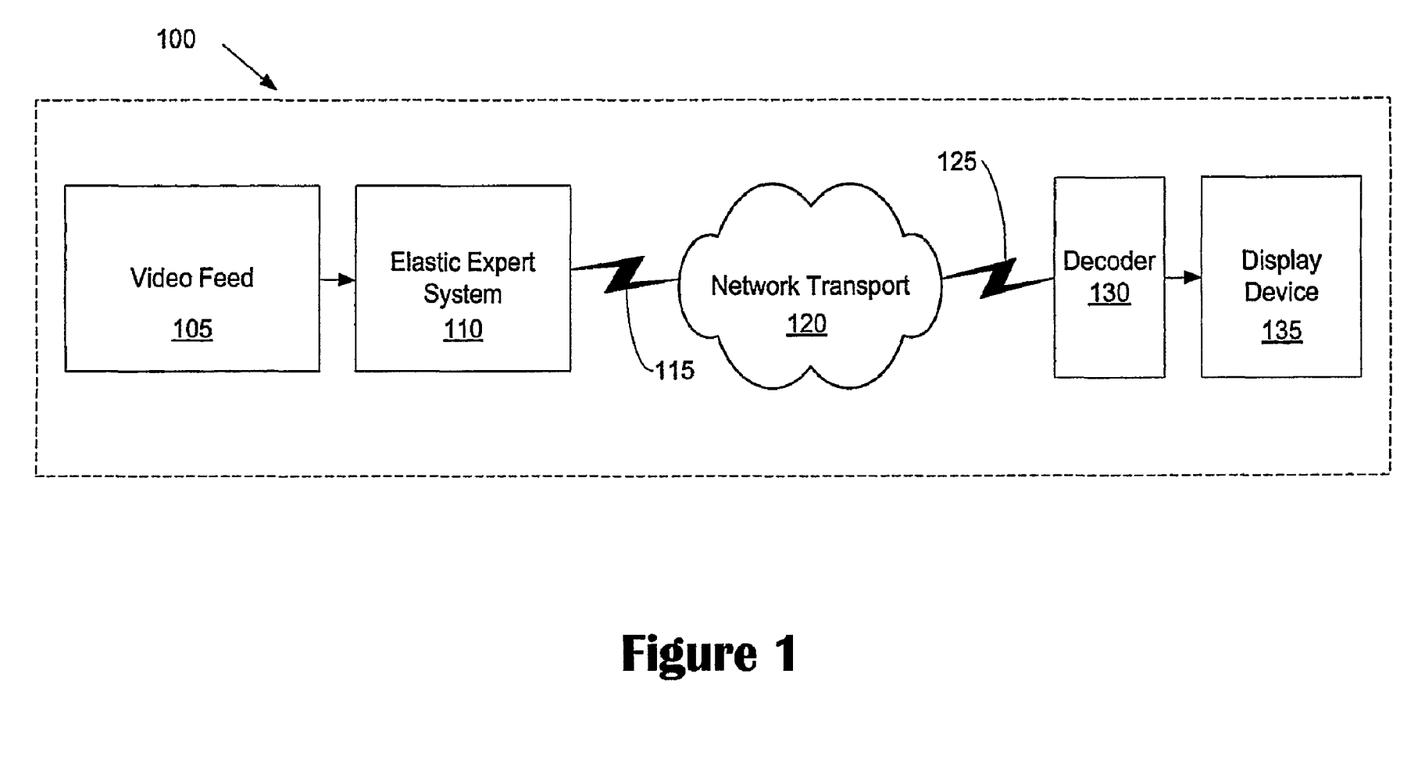
FIG. 1 illustrates a representative operating environment for the elastic expert system, according to an exemplary embodiment.

FIG. 1 illustrates an exemplary operating environment 100 for the elastic expert system 110. As illustrated, the elastic expert system 110 is preferably situated between a video feed 105 and network 120. The elastic expert system 110 communicates video to the network 120 through communication link 115, whereby the network 120 sends the video to a decoder 130 and display device 135 through communication link 125. The network 120, and communication links 115, 125 may comprise any type of transmission medium, including, but not limited to, wired local networks, such as local area networks; wireless networks, such as the Internet; and mobile or cellular networks. In any event, as described below, the elastic expert system 110 considers the network resources available for the network 120 and communication links 115, 125 (collectively, the network resources), but is unconcerned with the type of network that the resources are associated with.

Figure 2:
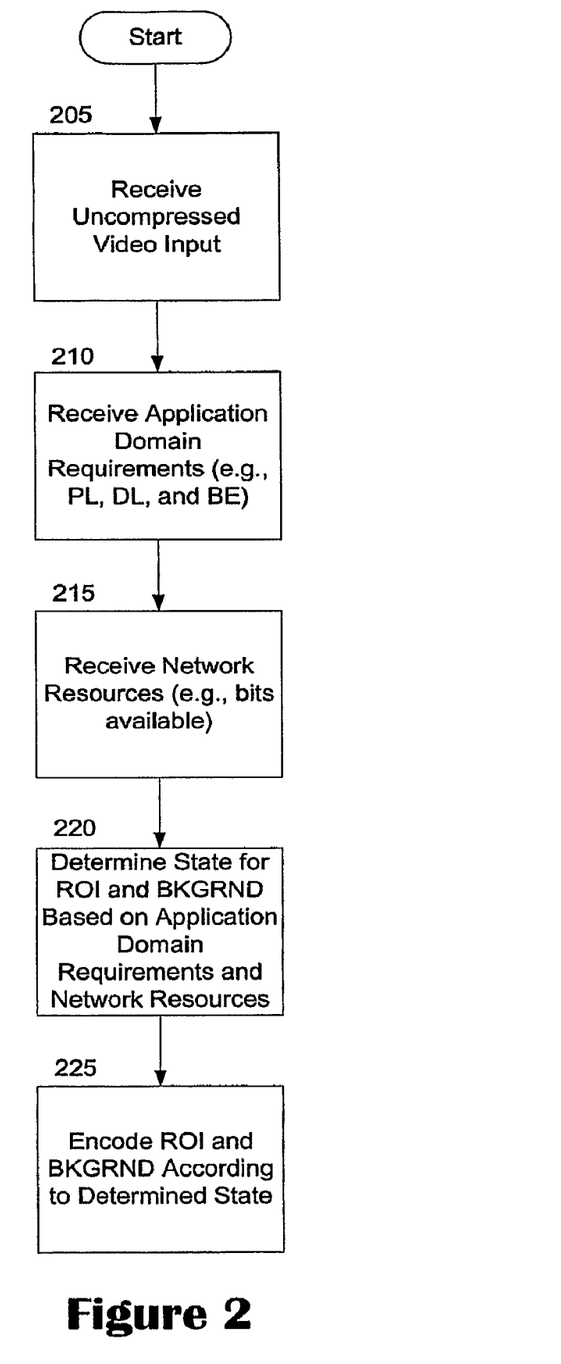
FIG. 2 illustrates a method for implementing the elastic expert system, according to an exemplary embodiment.

FIG. 2 illustrates a method for implementing the elastic expert system 110, according to an exemplary embodiment. It should be noted that the elastic expert system can be implemented in software, as is understood by one of ordinary skill in the art. Further, many modifications can be made to the elastic expert system 110 without departing from the scope and spirit of the invention.

According to an exemplary embodiment, the elastic expert system 110 has elasticity in terms of three attributes (as will be discussed in detail hereinbelow): (1) domain application requirements; (2) network resources; and (3) the window geometry of the region-of-interest. According to this embodiment, at step 205, the elastic expert system 110 receives uncompressed video input from a video source, such as a camera focused on a patient. At step 210, the expert system receives application domain requirements for the video. These application domain requirements may be static (off-line) or dynamic (on-line). In an exemplary embodiment, the elastic expert system 110 receives static domain requirements. The domain requirements, according to an exemplary embodiment of the elastic expert system 110, relate to four levels of quality: mathematical losslessness (ML) (i.e., there is no loss of any digital information); perceptual losslessness (PL) (i.e., there is no visual distinguish-ability with the original video); diagnostic or functional losslessness (DL or FL) (i.e., there may be visually perceivable artifacts, but they do not compromise visual diagnostic or functional assessment); and best effort (BE) (i.e., where the video quality is not distracting or annoying). Thus, these application domain requirements reflect values for PL, FL, and BE (as discussed further with reference to FIG. 4).

At step 215, the elastic expert system 110 observes the network resources available on the network 120 and communication links 115, 125. That is, in a preferred, yet exemplary embodiment, the elastic expert system 110 observes the bandwidth (i.e., total bits available for transmission) available on the network 120 (including communication links 115, 125) at step 215. As with the application domain requirements, the available network resources may be dynamic (on-line) or static (off-line). According to an exemplary embodiment of the elastic expert system 110, the network resources are dynamic and therefore may change over time. Accordingly, the elastic expert system continuously or periodically re-observes the network resources available.

Figure 5:
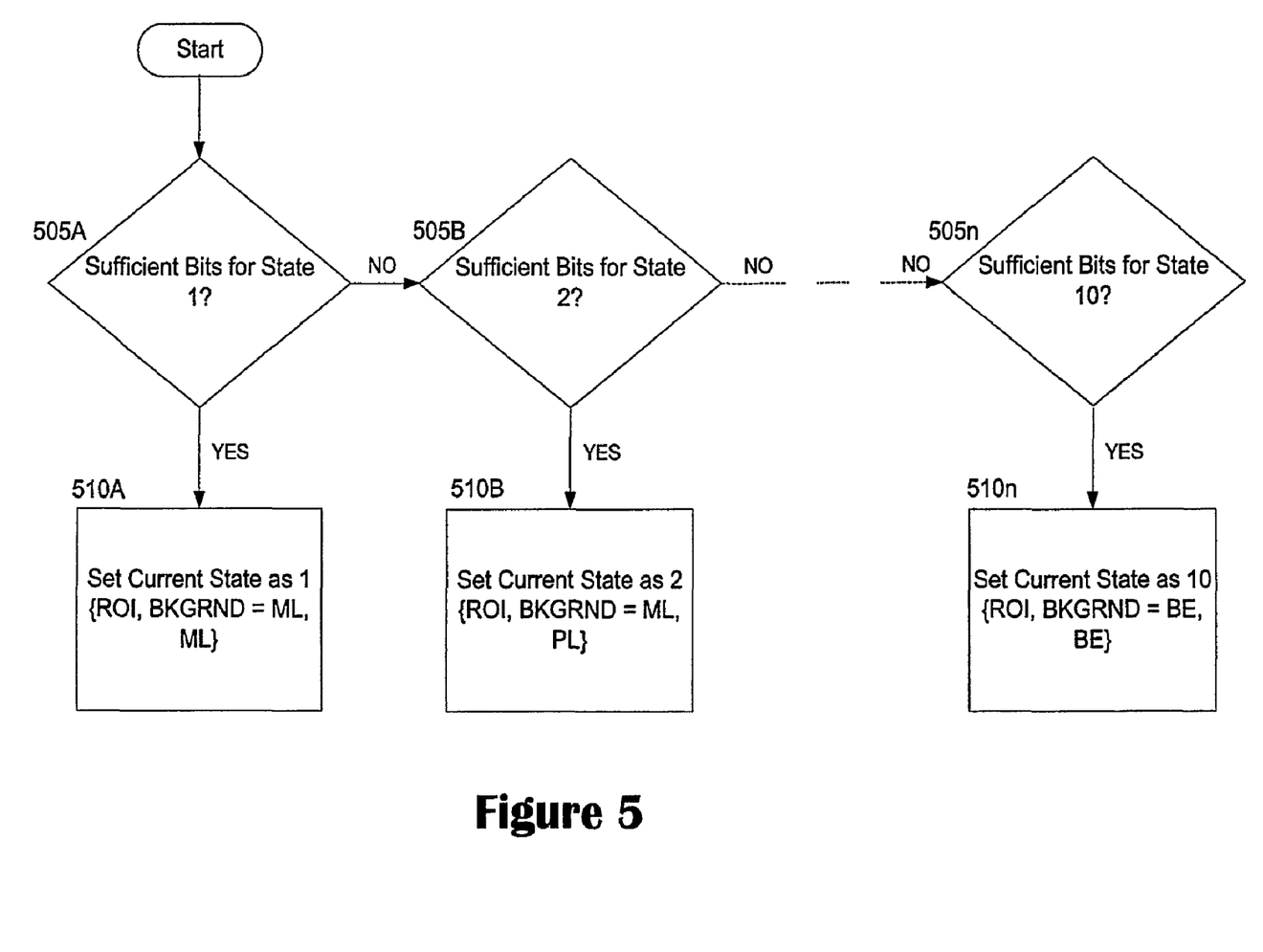
FIG. 5 illustrates a method for determining states in the elastic expert system, according to an exemplary embodiment.

Utilizing the application domain requirements collected from step 210 and the bandwidth observed from step 215, the elastic expert system 110 determines a state for encoding the ROI and BKGRND (and EROI, if utilized) at step 220 (as discussed further with reference to FIG. 5). Then, at step 225, the various regions, such as the ROI and BKGRND, are encoded according to the state determined at step 220 (as discussed further with reference to FIG. 8).

Figure 3A:
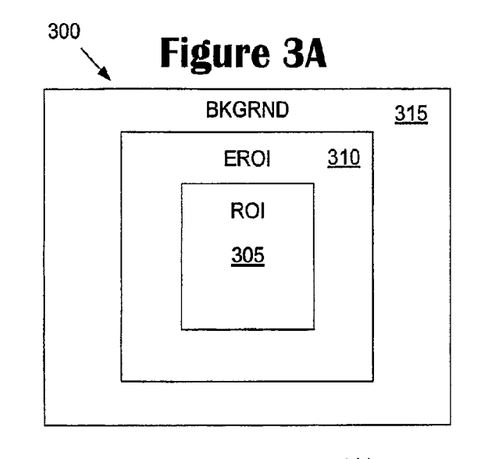
FIGS. 3A, 3B, and 3C illustrate methods for encoding video feed, according to several exemplary embodiments.
Figure 3B:
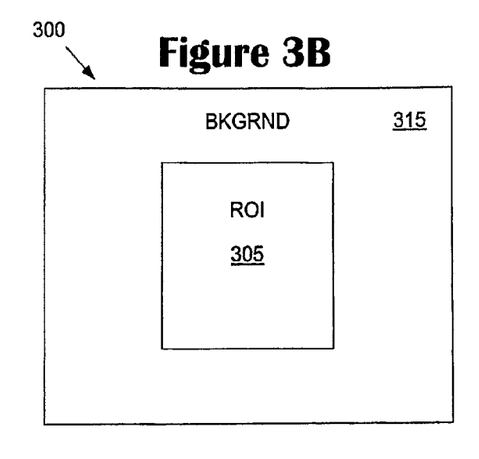
Figure 3C:
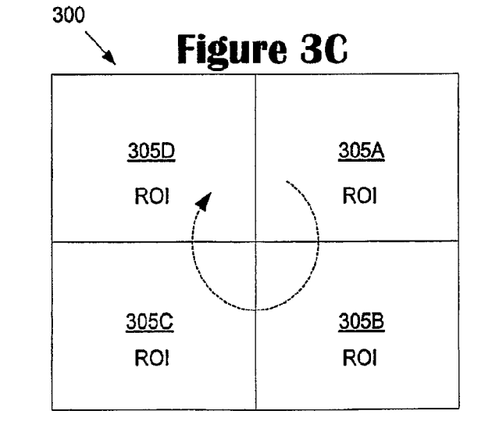

FIGS. 3A, 3B, and 3C illustrate several ways to encode a video feed using ROIs, according to an exemplary embodiment of the elastic expert system 110. Conventional methods for implementing ROIs comprise automatic and semi-automatic ROIs. Automatic methods perform the task of determination and tracking of the ROI, whereas semi-automatic methods leave the determination as a periodic task for the user to perform, and track a complex ROI contour representing the ROI boundary between these intervals. These methods are characterized by their complexity, but they lack a commensurate performance improvement. Hence, there is a motivation to perform tracking in a more simple but logical manner.

In FIG. 3A, a video image 300 is encoded by utilizing conventional ROI 305, EROI 310, and BKGRND 315. By utilizing an EROI 310, between the ROI 305 and BKGRND 315, the bit rate allocation between each region is less dramatic because the bit rate allocation is gradually stepped down in each region.

In FIG. 3B, the video image 300 is encoded using an ROI 305 and BKGRND 315 only. To aid in visual perception and reliability, this ROI 305 may be a preset size and placed in the middle of the image 300. According to an exemplary embodiment of the elastic expert system 110, additional elasticity is added to the expert system by allowing the size of the ROI to be assigned variable sizes, such as ¼, ⅑, and 1/16 of the video image size, and may be adjustable between each size. It is proposed to have simple templates for the ROI, with the size and shape of this template coming from among a small set of acceptable choices (e.g. elliptical ROI, ¼ the size of the image). The user may specify the template, and its center location. Once selected, all that changes until the user resets the ROI is the center location of the ROI template. The tracking algorithm determines the center location of the ROI template from frame to frame through a simple methodology based on color and motion information. For example, a new center location may be determined based on the estimated average horizontal and vertical displacements to the ROI template, which can be obtained using motion vectors.

FIG. 3C illustrates a method for encoding the video image 300, where the ROI 305 rotates around the video image 300 at a preset sampling frequency. This particular exemplary embodiment may be particularly applicable for the monitoring of surveillance video. In FIG. 3C, the ROI is depicted as rotating in a clockwise fashion, starting with the right hand corner at ROI 305A. At this ROI 305A, the BKGRND fills the other areas of the video image 300. At a preset frequency, the ROI 305A-D rotates around the screen in a clockwise fashion, covering BKGRND at respective portions. In this way, if the ROI 305 is rotated fast enough, each block of the screen will change from BKGRND to ROI quickly enough so that the actual region of interest in the video scene, even if not known apriori, will be captured with an adequate sampling frequency.

As discussed with reference to FIG. 2, the elastic expert system 110 encodes the video feed 105 according to four levels of quality: mathematical losslessness (ML) (i.e., there is no loss of any digital information); perceptual losslessness (PL) (i.e., there is no visual distinguish-ability with the original video); functional losslessness (FL) (i.e., there may be visually perceivable artifacts, but they do not compromise functional assessment); and best effort (BE) (i.e., where the video quality is not distracting or annoying). To quantify these levels of video quality, a functional hierarchy assessment is performed (although it is noted that ML is not required to be determined from the functional hierarchy assessment, because mathematical losslessness (ML) is a mathematically deterministic video quality level (unlike PL, FL, and BE), obtained when no quantization based compression is applied). Based on the functional hierarchy assessment (and determination of a value for ML), the application domain requirements for the elastic expert system 110 can be set.

Figure 4:
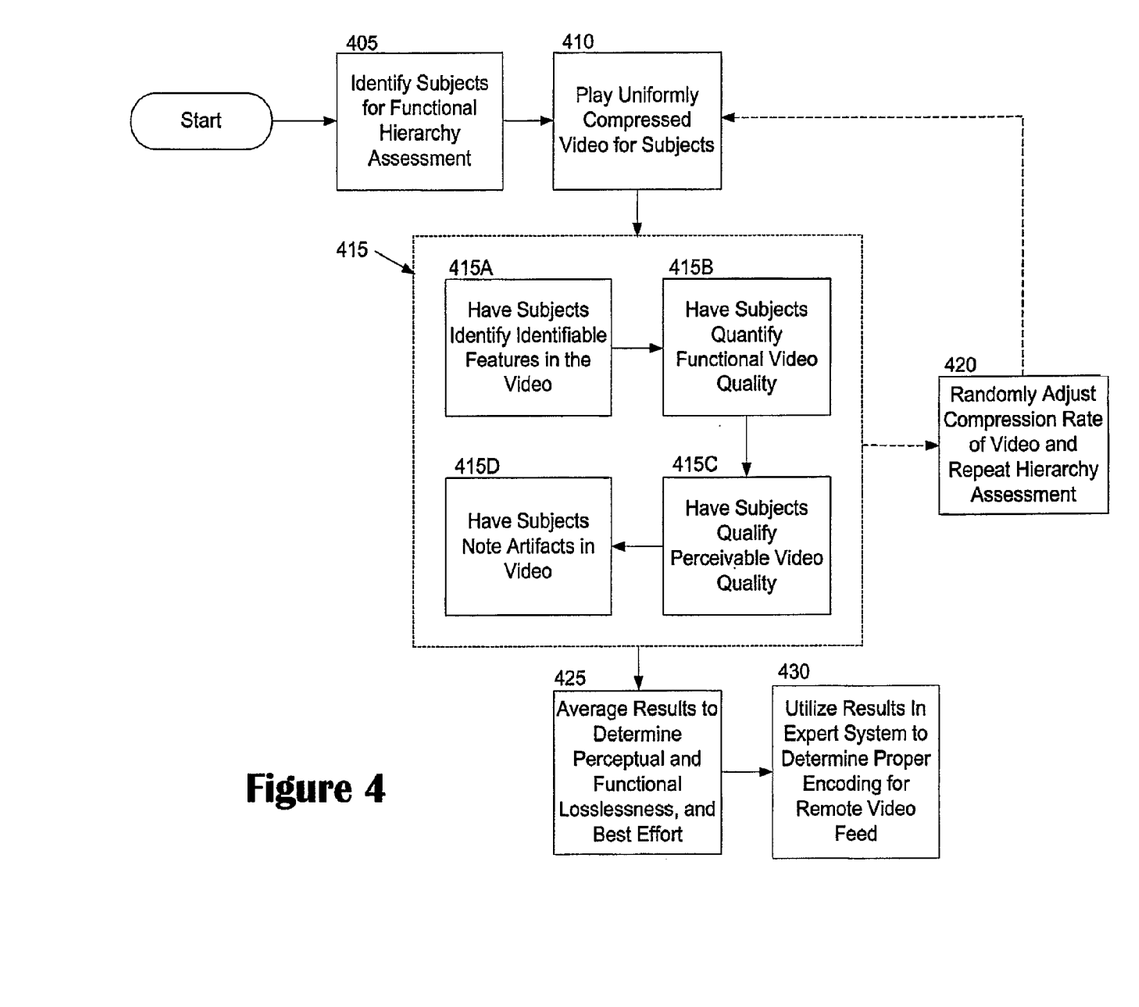
FIG. 4 illustrates a method for implementing a functional hierarchy assessment, according to an exemplary embodiment.

FIG. 4 illustrates a method for implementing a functional hierarchy assessment, according to an exemplary embodiment. At step 405, subjects are identified for the functional hierarchy assessment. If the purpose of the elastic expert system 110 is to be utilized in a tele-health or tele-medicine environment, then physician experts would be identified and selected as the test subjects.

Once the subjects are identified, a video with uniform spatial quality is played for the subjects at step 410. As the video is played, the subjects are asked to give a functional assessment of the features and perceptual losslessness of the video. In an exemplary embodiment, the subjects may be asked to: (at step 415A) identify identifiable features in the video; (at step 415B) quantify the video quality based on whether a diagnostic or functional assessment could be made from the video; (at step 415C) qualify whether the video appears to be perceptually perfect; and (at step 415D) make a note of any artifacts they see in the video. Once the video has been shown at one compression bit rate, at step 420, the compression rate of the video is randomly adjusted and the functional assessment at steps 410 and 415 is repeated. This cycle continues until a significant number of compression rates have been analyzed.

Using the results from the functional assessments gathered for each bit rate shown to the subjects, the average of the results can be taken at step 425 to determine PL, FL, and BE. Specifically, If TBR_FLi represents the TBR required for FL for feature i averaged over several experts and TBR_PL and TBR_BE represents the TBR required for PL and BE, respectively, also averaged over several experts, then the corresponding bits per pixel (bpp) required for each losslessness can be expressed as:

$$bpp\_FLi = \frac{TBR\_FLi}{FR\_RATE \times FR\_SIZE}$$

$$bpp\_PL = \frac{TBR\_PL}{FR\_RATE \times FR\_SIZE}$$

$$bpp\_BE = \frac{TBR\_BE}{FR\_RATE \times FR\_SIZE}$$

where FR_RATE represents the frame rate (in frames per second) and FR_SIZE represents the spatial resolution of the training videos (assuming one fixed value). To obtain one value bpp_FL encompassing all features i, there are two possibilities—the mean, or the maximum value. This step achieves the quantification of video quality.

As a practical example of the above, doctors could be used as subjects for the functional hierarchy assessment. A set of training videos are played for the doctors at a variety of total bit rates (TBR) and uniform spatial quality. The doctors are then asked to identify maximum levels of compression that can be applied while retaining certain levels of quality. The compressed training videos are presented in random order to the doctors and they complete an evaluation whose format is shown in Table 1, which in this example is specific to pediatric respiratory distress.

TABLE 1

| Random Video Sample | Feature Sets | FL? (1-4) | PL? (Yes/No) | Comments |
|---|---|---|---|---|
| 1-n | RR<br>OC<br>WB<br>... | | | |

As illustrated in the evaluate illustrated in Table 1, each doctor evaluates each of the videos according to the evaluation template shown, where the feature sets identified in this example stand for a rib retraction (RR), oral cyanosis (OC), and work of breathing (WB). Each sample number represents a video at a particular total bit rate (TBR). The physician expert lists whichever features he/she can identify in the video at that particular bit-rate. The remaining three columns represent the quantification of the video quality information. In the "FL?" column, the four options relate to the quality of the video for clinical (i.e., functional) assessment of each feature set: 1—No, 2—Maybe Not, 3—Likely, 4—Yes. The lowest TBR at which the evaluation is 4 represents the threshold FL for the particular feature. Similarly, the lowest TBR at which "PL?" is 'Yes' represents the PL threshold for the particular video. In the 'Comments' column, the expert identifies any annoying or distracting artifacts in the video. This information can be used to obtain the threshold for BE for the particular video. It should be noted that the above table represents one video evaluated by one particular expert, whereas the complete test set consists of several videos evaluated by several physician experts.

After completing the functional hierarchy assessment, the elastic expert system 110 is made adaptive to network conditions through the notion of an encoder state. An encoder state is defined by a pair of levels, one corresponding to the ROI, and the other corresponding to the BKGRND. The notion of an encoder state also helps the encoder use the information on application domain requirements and map them to the ROI and BKGRND regions in the video. The complete state table for the encoder is shown in Table 2.

TABLE 2

| ROI | BG | | | |
|---|---|---|---|---|
| | ML | PL | FL | BE |
| ML | 1 | 2 | 3 | 4 |
| PL | n/a | 5 | 6 | 7 |
| FL | n/a | n/a | 8 | 9 |
| BE | n/a | n/a | n/a | 10 |

The states are numbered 1 to 10 according to decreasing priority, based on the premise that the ROI quality should be at least the same as or better than the BKGRND quality. For example, state 2 represents ML quality ROI and PL quality BKGRND, and state 8 represents FL quality ROI and FL quality BKGRND. Based on this design, at very low TBR, ROI quality will not be of a functional-lossless level, and at very high TBR, the entire frame quality can be of a mathematical-lossless level. In between these TBR, the design is expected to have high value because of elastic associations between different levels of losslessness and different regions in the scene. For example, in narrowband environments, the design can achieve FL ROI quality, whereas in broadband environments, the design can achieve ML ROI and PL BKGRND qualities.

To determine which state the elastic expert system 110 is in, a group of pictures (GOP)-level bit allocation algorithm is utilized, based on nominal bpp values for PL, FL, and BE quality levels. State determination is done at the GOP level in order to average over I, P, and B frames. For the video currently being encoded, the nominal number of bits required per GOP for DL in the ROI denoted by R_ROI_FL, for example, is:

$$R\_ROI\_FL = bpp\_FL \times ROI\_SIZE \times N\_GOP$$

ROI_SIZE is the average size of the ROI for the current GOP, and may be a window of standard shape and size around the feature(s). N_GOP denotes the number of frames in GOP. Similar expressions hold for the nominal number of bits required for other quality levels for the ROI and BKGRND.

FIG. 5 illustrates a method for determining states in the elastic expert system 110, according to an exemplary embodiment. At the beginning of a new GOP, the encoder tries to occupy the highest priority state given the current TBR. At step 505A, the elastic expert system 110 determines if enough bits are present for it to enter state 1. Specifically, if R denotes the target number of bits in a GOP, the encoder checks if it can occupy state 1, governed by the condition: R>R_ROI_ML+R_BKGRND_ML (i.e., are the total bits available greater than those necessary to have a mathematically lossless region-of-interest and background)? If so, the elastic expert system 110 occupies state 1 at step 510A. Otherwise the system 110 checks if it can occupy state 2 at step 505B. According to the exemplary embodiment in Table 2, state 2 is governed by the condition: R>R_ROI_ML+R_BKGRND_PL (i.e., are the total bits available greater than those necessary to have a mathematically lossless region-of-interest and perceptually lossless background)? If yes, then state 2 is entered. If no, then the elastic expert system 110 continues until it occupies one of the ten possible exemplary states, as summarized in Table 2 and FIG. 5.

In each state, the BKGRND is allocated bits first, and then the remaining bits are allocated to the ROI. This is done to ensure that the ROI gets bits in excess of the nominal value. For example, in state 9, where the ROI has FL quality, and BKGRND has BE quality, the allocation is done as follows:

$$R\_BKGRND = R\_BKGRND\_BE$$

$$R\_ROI = R - R\_BKGRND$$

R_ROI and R_BKGRND denote the target number of bits in a GOP for the ROI and BKGRND, respectively. If the encoder determines that state 9 is the current GOP state, the BKGRND gets assigned R_BKGRND_BE bits, and the ROI gets assigned at least R_BKGRND_FL bits. The only exception is state 10, where all the bits are allocated to the ROI.

At a given TBR, the encoder occupies a particular state, which is the highest priority under the given conditions. When the TBR changes, as in a variable bit rate (VBR) channel, the encoder will likely transition to a new state at the beginning of a new GOP. Depending on the change in TBR, the encoder may move to a higher priority state or a lower priority state. In this way, the elastic system achieves its two intended goals: (a) user-specified quality through incorporation of user inputs at the beginning of the design process itself, and (b) robustness to variability and limitations in channel TBR.

In a further exemplary embodiment, the states of the elastic expert system 110 may be periodically changed or shifted to increase the visual perception of the ROI. For example, for FL, the average bpp value over the features is chosen as the nominal value. Accordingly, the ROI may not be of FL quality even if its current state indicates that it should be so. Similarly, because PL and BE are subjective notions of quality, these functional assessments may vary from viewer to viewer. Therefore, a quality level for the ROI as indicated by a particular state might not indeed be achieved as far as the current viewer of the video is concerned. To alleviate this problem, the elastic expert system 110, according to an exemplary embodiment, allocates more bits to the ROI whenever such a condition is detected. This allocation is done by a state transition from the current state to the next lower priority state in the same row. For example, suppose the encoder transitions from state 6 to state 7:

STATE 6: $R\_BKGRND = R\_BKGRND\_FL$ $R\_ROI = R - R\_BKGRND$

STATE 7: $R\_BKGRND = R\_BKGRND\_BE$ $R\_ROI = R - R\_BKGRND$

Clearly, at a given TBR, R_ROI is higher in state 7 than in state 6. Transitions are not allowed to states in lower rows because the ROI quality level changes across rows. Instead, in states 4, 7, and 9, where the encoder is at the far end of a row (i.e., with BE quality BKGRND), R_ROI is increased by a parameter update i.e., by simply reducing R_BKGRND to a new, lower value R_BKGRND_BE_MIN, compared to R_BKGRND_BE.

There are two ways to detect when ROI quality is insufficient. First, a manual trigger may be used to indicate that video quality within the ROI is unsatisfactory. That is, a remote viewer may send an indication through the network that the state of the elastic expert system 110 needs to be shifted. This option is straightforward, yet cumbersome. Thus, an automatic trigger is preferred.

An automatic trigger may be used to indicate that video quality within the ROI is unsatisfactory. Various quality metrics, including a PSNR-difference approach between the ROI and BKGRND, a constant ROI PSNR approach, are options to automatically trigger a state transition or parameter update.

Figure 6:
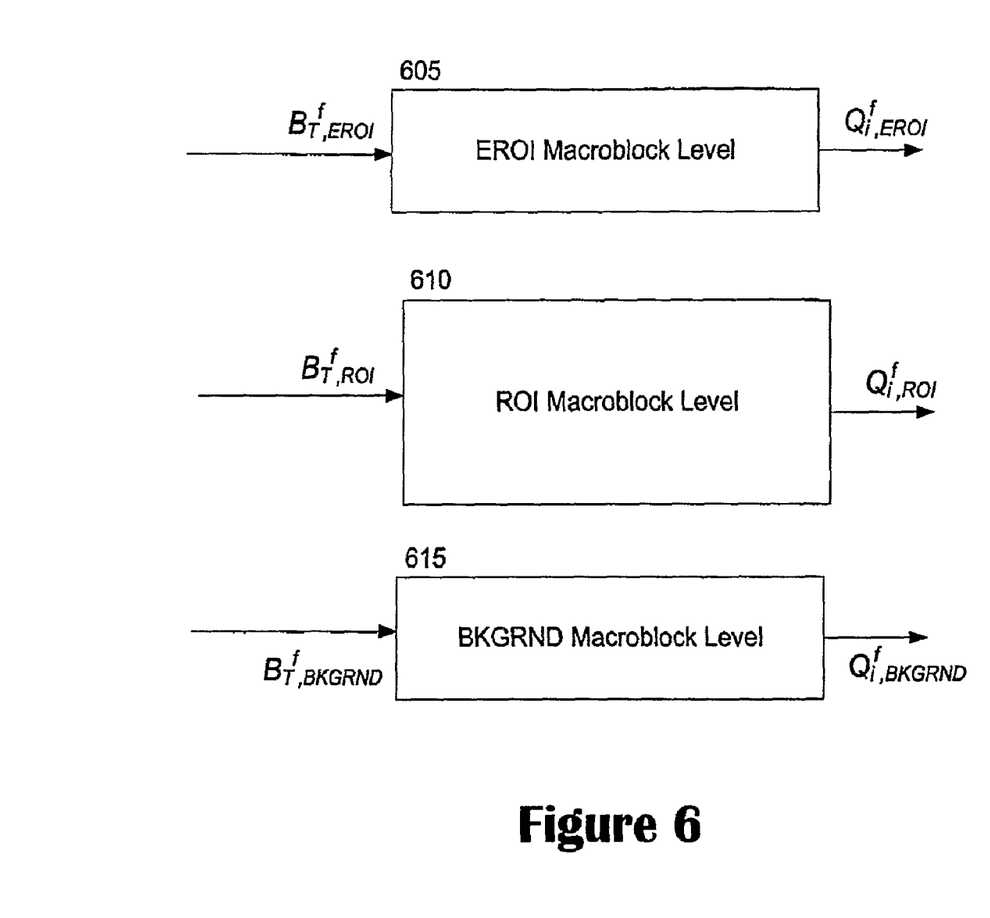
FIG. 6 illustrates a method for converting allocated bits to quantization parameters, according to an exemplary embodiment.

Once bits have been allocated to each region (according to any exemplary embodiment), the bits can be related to the quantization parameter (Q) to perform encoding of the video. Accordingly, as illustrated at step 610 of FIG. 6, Lagrangian optimization leads to the following expression for the ROI Q in one exemplary embodiment:

$$Q_{i,ROI}^f = \sqrt{\frac{AK\sigma_{i,ROI}^f \sum_{i=1}^{N} \sigma_{i,ROI}^f \omega_{i,ROI}^f}{(B_{T,ROI}^f - AN_{ROI}C)\omega_{i,ROI}^f}}$$

The subscript i represents the macroblock (MB) number, the superscript f represents the frame number, $B_{T,ROI}^f$ is the target number of bits for the ROI, $\sigma_{T,ROI}^f$ is the variance of the $i^{th}$ MB of the ROI, $\omega_{T,ROI}^f$ is the distortion weight for the ROI MB, A is the number of pixels in a MB, $N_{ROI}$ is the number of MBs in the ROI, C is the overhead rate, and K is a constant. $B^f_{T,ROI}$ provides an additional degree of freedom over distortion weights to control ROI quality. Note that this is only dependent on the bits allocated to the ROI ($B^f_{T,ROI}$) at step 610, and the distortion weights for the ROI. Thus similar processes are performed at steps 605 and 615 to determine the quantization parameters for the EROI and BKGRND regions of the frame.

In addition to the exemplary embodiments discussed above, which allocate bits differently between different spatial regions such as the ROI and BKGNRD, in an alternative exemplary embodiment, or in addition to the exemplary embodiment discussed above, a temporal approach may be used wherein the BKGRND is encoded less often than the ROI. For example, in a remote assessment application, the ROI may need to be transmitted at the highest frame rate e.g. 30 frames per second (fps). On the other hand, the BKGRND may not be needed that often, and hence may be transmitted at a sub-sampled rate (e.g., 5 fps). Utilizing this approach therefore offers significant savings in bits.

Figure 7:
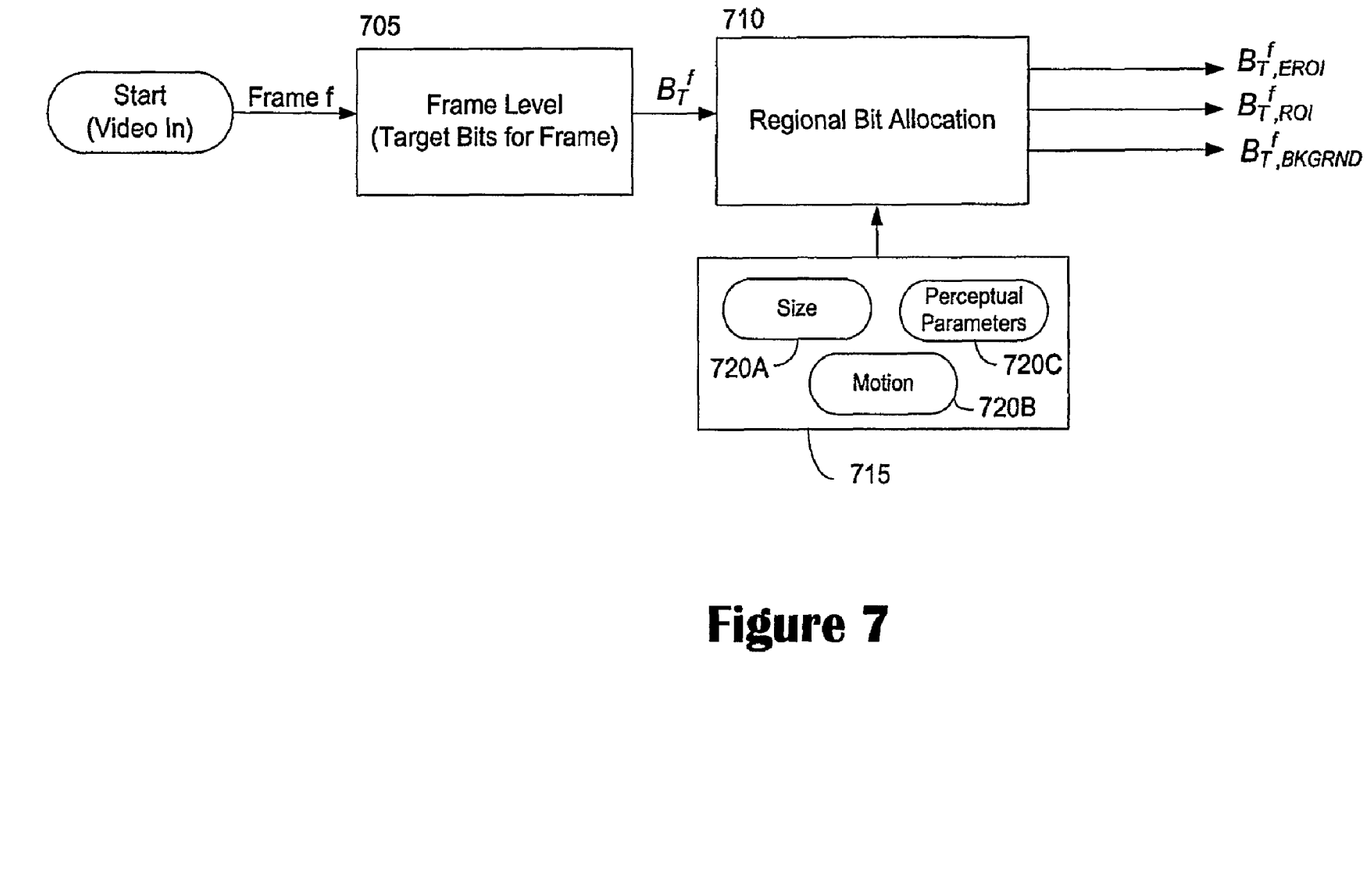
FIG. 7 illustrates a method for implementing the elastic expert system, according to another exemplary embodiment.

FIG. 7 illustrates another exemplary embodiment of the elastic expert system 110. By distributing the target bits for the frame between each region—ROI, EROI, and BKGRND, bit allocation is shifted from the frame level to individual regions. Therefore, when a frame arrives at step 705, the network resources 710 are evaluated to determine a target number of bits available for the entire frame ($B_T^f$), where the superscript f represents the frame number. Subject to the constraint that the total bit rate available is equal to the bit rate from the ROI ($B_{T,ROI}^f$), EROI ($B_{T,EROI}^f$), and BKGRND ($B_{T,BKGRND}^f$), expressed as, $$B_{T,ROI}^f + B_{T,EROI}^f + B_{T,BKGRND}^f = B_T^f$$

selecting the parameters for the three regions is a major step towards achieving the envisioned elastic system 110. As illustrated at step 715, the elastic expert system 110 determines the regional bit allocation by incorporating size 720A and motion features 720B as follows:

$$B_{T,ROI} = (\alpha_{SIZE}S_{ROI} + \alpha_{MOTION}M_{ROI})B_T^f$$

$$B_{T,EROI} = (\alpha_{SIZE}S_{EROI} + \alpha_{MOTION}M_{EROI})B_T^f$$

$$B_{T,BKGRND} = (\alpha_{SIZE}S_{BKGRND} + \alpha_{MOTION}M_{BKGRND})B_T^f$$

where, $$S_{ROI} = \frac{N_{ROI}}{N}, S_{EROI} = \frac{N_{EROI}}{N}, S_{BKGRND} = \frac{N_{BKGRND}}{N}$$

$$M_{ROI} = \frac{\sum_{ROI}|MV|}{\sum_{FRAME}|MV|},$$

$$M_{EROI} = \frac{\sum_{EROI}|MV|}{\sum_{FRAME}|MV|},$$

$$M_{BKGRND} = \frac{\sum_{BKGRND}|MV|}{\sum_{FRAME}|MV|}$$

The S parameters are the normalized region size parameters, and the M parameters are the normalized region activity descriptors—obtained from the motion vectors (MV) of each region. For example, $S_{ROI}$, represents the normalized size of the ROI in the video frame, and is calculated as the ratio of the number of ROI macroblocks in the video frame ($N_{ROI}$) to the total number of macroblocks in the video frame (N). Similarly, $M_{ROI}$ represents the normalized motion activity in the ROI, and is calculated as the ratio of the sum of all motion vectors corresponding to ROI macroblocks to the sum of all motion vectors of all macroblocks in the video frame. The α parameters are the weights for the size and (motion parameters, with $\alpha_{SIZE} + \alpha_{MOTION} = 1$. Thus, for a region, the larger its size or greater its motion, the higher the number of bits allocated.

Along with size and motion factors, perceptual features 720C may also be used. These perceptual weights are used in this exemplary embodiment to achieve bit transfer between regions as, $$B_{T,ROI}^f = B_{T,ROI} + I_{ROI,EROI}B_{T,EROI} + I_{ROI,BKGRND}B_{T,BKGRND}$$

$$B_{T,EROI}^f = B_{T,EROI} - I_{ROI,EROI}B_{T,EROI} + I_{EROI,BKGRND}B_{T,BKGRND}$$

$$B_{T,BKGRND}^f =$$
$$B_{T,BKGRND} - I_{ROI,BKGRND}B_{T,BKGRND} - I_{EROI,BKGRND}B_{T,BKGRND}$$

$$I_{x,y} = \frac{\sum_i w_{i,x}/S_x}{\sum_j w_{j,y}/S_y} \cdot \gamma$$

where the numerator and denominator terms in the equation computing the I parameters are the normalized perceptual weights of regions x and y respectively, and γ is a network-based parameter introduced to control the amount of bit transfer. Once the bits for each region have been assigned according to this embodiment, the bits can then be related to the quantization parameter (Q) to perform encoding of the video, as discussed above with reference to FIG. 6.

Figure 8:
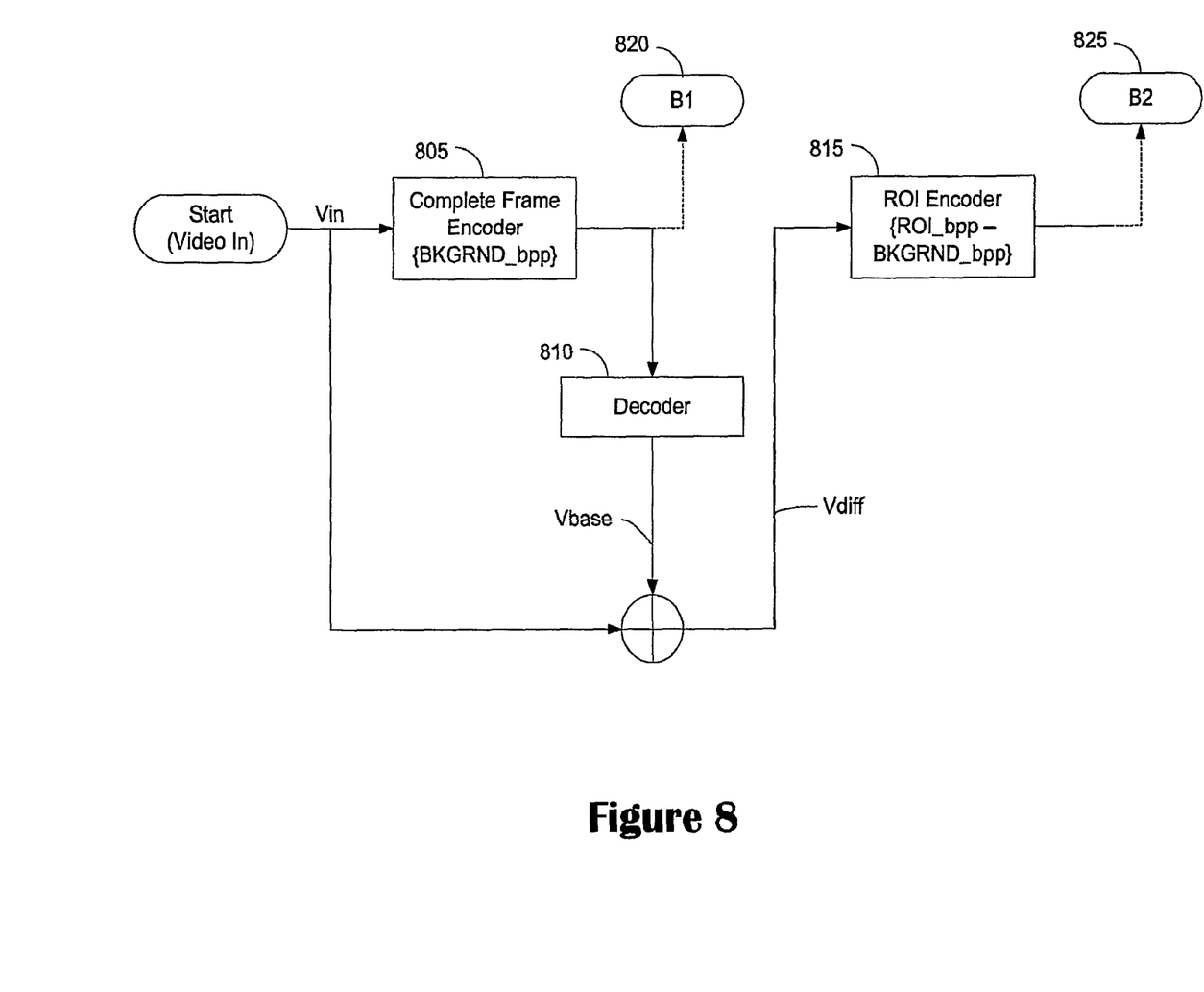
FIG. 8 illustrates a method for implementing the elastic expert system, according to an exemplary embodiment.

FIG. 8 illustrates yet another exemplary method for implementing the elastic expert system 110 (according to any exemplary embodiment). Once the bpp of the BKGRND is determined using the elastic expert system 110, video input $V_{in}$ is fed to an encoder at step 805. This encoder performs uniform encoding of the entire frame at a bit rate of $bpp_{BKGRND}$ bpp (according to the bits allocated to the BKGRND), and this results in the base bitstream (B1) at step 820. This base bitstream is then decoded to produce $V_{base}$ at step 810, which is then subtracted from $V_{in}$ to result in the "error" video input, $V_{diff}$. $V_{diff}$ is then encoded using a ROI only encoder which encodes only the ROI of the input at a bit rate of $bpp_{ROI} - bpp_{BKGRND}$ (according to the bits allocated to the ROI and BKGRND), resulting in the enhanced ROI bitstream (B2) at step 825. These two bitstreams together represent the output of the elastic expert system 110 according to this exemplary embodiment.

Although the elastic expert system 110 has been illustrated in exemplary embodiments, it is to be understood by one of ordinary skill in the art that the present disclosure has been made only by way of example, and that numerous modifications may be made without departing from the spirit and scope of the methods and systems hereinafter claimed.

What is claimed is:

1. A method for allocating bits for a region-of-interest within a video feed, comprising the steps of:
    determining application domain requirements for the video feed;
    observing network resources available for transmitting the video feed over a network;
    allocating bits for the region-of-interest within the video feed based on the application domain requirements and the network resources available; and
    allocating bits for encoding a background region within the video feed based on the application domain requirements and the network resources available, where the allocated bits are to be used to support encoding of the region-of-interest and the background region within the video feed.

2. A method for allocating bits for a region-of-interest within a video feed, comprising the steps of:
    determining application domain requirements for a video feed;
    observing network resources available for transmitting the video feed over a network; and
    allocating bits for the region-of-interest within the video feed based on the application domain requirements and the network resources available, wherein
    the allocated bits are to be used to support encoding of the region-of-interest within the video feed, and
    the application domain requirements comprise values relating to one of: mathematical losslessness (ML), perceptual losslessness (PL), functional losslessness (FL), and best effort (BE).

3. The method of claim 1, further comprising the step of encoding the region-of-interest within the video feed according to the bits allocated to the region-of-interest.

4. The method of claim 1, wherein the step of allocating bits for the region-of-interest within the video feed comprises the steps of:
    determining whether there are sufficient bits available on the network to occupy a state of quality according to the application domain requirements; and
    if there are sufficient bits available to occupy the state of quality, allocating bits to the region-of-interest pursuant to the state of quality.

5. The method of claim 4, further comprising the steps of:
    automatically identifying a new state of quality to increase visual perception in the region-of-interest; and
    assigning bits to the region-of-interest based on the new state of quality.

6. The method of claim 4, further comprising the steps of:
    allowing a viewer of the video feed to identify a new state of quality to increase visual perception in the region-of-interest; and
    allocating bits to the region-of-interest based on the new state of quality.

7. The method of claim 4, wherein the state of quality determination is performed based on a group of pictures (GOP).

8. The method of claim 1, wherein the step of observing resources available for transmitting the video feed comprises periodically checking the network resources to observe the total bits available for transmitting the video over the network.

9. The method of claim 1, wherein the application domain requirements are static.

10. The method of claim 1, wherein the application domain requirements are dynamic.

11. The method of claim 1, wherein the region-of-interest comprises a set of pre-sized and pre-shaped templates for use within the video feed.

12. The method of claim 11, further comprising the step of enabling a viewer of the video feed to specify a size and shape of one or more of the templates and a center location for each specified template.

13. The method of claim 1, wherein the region-of-interest periodically changes locations within pre-defined areas of the video feed.

14. The method of claim 13, wherein the pre-defined areas of the video feed comprise four equally sized quadrants.

15. The method of claim 1, wherein determining the application domain requirements comprises, for each of the region of interest and the background region, determining application domain requirements for the video feed.

16. The method of claim 1, further comprising the step of encoding the background region within the video feed according to the bits allocated to the background region.

17. The method of claim 2, wherein the step of allocating bits for the region-of-interest within the video feed comprises the steps of:
    determining whether there are sufficient bits available on the network to occupy a state of quality according to the application domain requirements; and
    if there are sufficient bits available to occupy the state of quality, allocating bits to the region-of-interest pursuant to the state of quality.

18. The method of claim 17, further comprising the steps of:
    automatically identifying a new state of quality to increase visual perception in the region-of-interest; and
    assigning bits to the region-of-interest based on the new state of quality.

19. A method for allocating bits for a region-of-interest within a video feed, comprising the steps of:
- determining application domain requirements for a video feed;
- observing network resources available for transmitting the video feed over a network;
- allocating bits for the region-of-interest within the video feed based on the application domain requirements and the network resources available; and
- allocating bits for encoding an extended region-of-interest within the video feed based on the application domain requirements and the network resources available, wherein the allocated bits are to be used to support encoding of the region-of-interest within the video feed.

20. The method of claim 19, wherein the step of allocating bits for the region-of-interest within the video feed comprises the steps of:
- determining whether there are sufficient bits available on the network to occupy a state of quality according to the application domain requirements; and
- if there are sufficient bits available to occupy the state of quality, allocating bits to the region-of-interest pursuant to the state of quality.

* * * * *